(12) United States Patent
Arocena De La Rua et al.

(10) Patent No.: US 9,651,022 B2
(45) Date of Patent: May 16, 2017

(54) MANUFACTURING METHOD OF WIND TURBINE BLADES OF VARIABLE LENGTH

(75) Inventors: Ion Arocena De La Rua, Sarriguren (ES); Eneko Sanz Pascual, Sarriguren (ES); Maria Garcia Fernandez Aviles, Madrid (ES); Raquel Aguilar Melendez, Madrid (ES)

(73) Assignee: GAMESA INNOVATION & TECHNOLOGY, S.L., Sarriguren (Navarra) (ES)

( * ) Notice: Subject to any disclaimer, the term of this patent is extended or adjusted under 35 U.S.C. 154(b) by 523 days.

(21) Appl. No.: 13/534,685

(22) Filed: Jun. 27, 2012

(65) Prior Publication Data

US 2012/0315146 A1 Dec. 13, 2012

(30) Foreign Application Priority Data

Jul. 6, 2011 (ES) .................................. 201100762

(51) Int. Cl.
*F03D 1/06* (2006.01)
(52) U.S. Cl.
CPC ...... *F03D 1/0675* (2013.01); *F05B 2230/601* (2013.01); *F05B 2240/302* (2013.01); *F05B 2240/313* (2013.01); *Y02E 10/721* (2013.01); *Y02P 70/523* (2015.11); *Y10T 29/49336* (2015.01)
(58) Field of Classification Search
CPC ...... F03D 1/0675; F03D 1/065; F03D 1/0608; F05B 2230/601; F05B 2240/302; F05B 2240/313; Y10T 29/49336; Y02E 10/721
USPC .......................... 416/241 R; 29/889.7, 889.71
See application file for complete search history.

(56) References Cited

U.S. PATENT DOCUMENTS

| 2009/0169390 A1 | 7/2009 | Nies |
| 2011/0076149 A1* | 3/2011 | Santiago ............... F03D 1/0675 416/223 R |
| 2012/0070299 A1* | 3/2012 | Fuglsang et al. ......... 416/223 R |
| 2012/0211637 A1* | 8/2012 | Christiansen et al. ........ 249/102 |

(Continued)

FOREIGN PATENT DOCUMENTS

| DE | 19833869 C1 * | 3/2000 |
| DK | WO 2010133585 A1 * | 11/2010 ........... F03D 1/0641 |
| WO | 2005/100781 A1 | 10/2005 |

(Continued)

OTHER PUBLICATIONS

Schroeder, Sectional mold for wind power rotor blade made of fiber-reinforced resin, produces blades of differing size and improved aerodynamic efficiency, avoiding cost of stocking one mold per blade, Mar. 30, 2000, DE19833869C1 abstract.*

(Continued)

*Primary Examiner* — Gregory Anderson
*Assistant Examiner* — Michael Sehn
(74) *Attorney, Agent, or Firm* — Ladas & Parry LLP

(57) ABSTRACT

A method of manufacturing wind turbine blades of variable length with connection elements with the rotor hub. The method includes providing and using enlarged manufacturing molds having a common zone of a predetermined length and, at least, an adaptive zone arranged with the length needed for manufacturing the blades with a desired length, particularly the length required for optimizing the annual energy production (AEP) of a predetermined wind turbine model in a predetermined site.

9 Claims, 3 Drawing Sheets

(56) References Cited

U.S. PATENT DOCUMENTS

2013/0068888 A1* 3/2013 Smith .......................... 244/124

FOREIGN PATENT DOCUMENTS

WO  2006/103307 A2  10/2006
WO  2007/051879 A1  5/2007

OTHER PUBLICATIONS

Schroeder, Sectional mold for wind power rotor blade made of fiber-reinforced resin, produces blades of differing size and improved aerodynamic efficiency, avoiding cost of stocking one mold per blade, Mar. 30, 2000, DE19833869C1 machine translation.*
Espacenet English abstract of WO 2005/100781 A1.
Espacenet English abstract of WO 2006/103307 A2.
Espacenet English abstract of WO 2007/051879 A1.

* cited by examiner

MANUFACTURING METHOD OF WIND TURBINE BLADES OF VARIABLE LENGTH

FIELD OF THE INVENTION

The present invention relates generally to a manufacturing method of wind turbine blades of variable length.

BACKGROUND

Wind turbines include a rotor that supports a number of blades extending radially therefrom for capturing the kinetic energy of the wind and causing a rotational motion of a driving train coupled to an electric generator for producing electrical power.

The amount of energy produced by wind turbines is dependant on the rotor blade sweeping surface that receives the action from the wind and consequently increasing the length of the blades leads normally to an increase of the power output of the wind turbine.

The energy produced by a wind turbine depends, among other factors, on the diameter of the rotor and on the characteristics of the wind at the site where the wind turbine is installed.

To optimize the energy produced at the wind turbine site, the usual procedure in selecting the most appropriate wind turbine is the following:

Identifying the wind characteristics at the site (maximum speed, average speed, turbulence . . . ).
Determining the site class (I, II or III) according to international standards (IEC-61400-1).
Selecting the suitable wind turbine model for the site. The wind turbine manufacturers usually offer wind turbines having specific blades for each class. In low wind sites they have larger blades than in high wind sites, so that the loads they induce on the wind turbine are similar.

This process leads to a very wide classification of sites (only three levels), so that if a site is midway between the limits of two classes an oversized wind turbine can be selected. In this case, the choice of the optimum diameter of the rotor for the intermediate subclass, would entail an optimization of the annual energy production (AEP).

The adaptation of a wind turbine to the site constrains including the selection of a blade length adapted to the features of the site it is discussed in US 2009/0169390. It is proposed the provision a kit of parts comprising several modules for assembling a modular rotor blade, wherein the several modules comprise at least one root-type module and at least one tip-type module and at least one further module of the root-type or the tip-type, wherein the at least one further module has a different shape compared to the other module of the same type. Finally a method for adapting a rotor of a wind turbine to a site constraint is provided.

Therefore the teaching of US 2009/0169390 is limited to the provision of a number of modules of wind turbine blades, manufactured according to standard procedures, for selecting a suitable set for assembling a blade adapted to a site constraint.

The problem of this approach is that it does not provide blades with the optimum length for each particular site.

This invention is addressed to the solution of this problem.

SUMMARY OF THE INVENTION

An object of this invention is to provide blades for wind turbines of predetermined features (i.e. specific wind turbine models) with the optimum length for a particular site.

Another object of this invention is to provide a manufacturing method of wind turbine blades of variable length.

These and other objects are met by a method of manufacturing wind turbine blades of variable length with connection means with the rotor hub comprising steps of providing and using enlarged manufacturing moulds having a common zone of a predetermined length and, at least, an adaptive zone arranged with the length needed for manufacturing the blades with a desired length.

In embodiments of the invention said desired length is the length required for optimizing the annual energy production (AEP) of a predetermined wind turbine model in a predetermined site. Hereby it is achieved a manufacturing method allowing the manufacturing of wind turbine blades with the optimum length for a given site improving therefore the current situation where there is only an offer of a limited set of blades of different length for a given wind turbine model.

In embodiments of the invention said enlarged manufacturing moulds are provided and used for the whole blades or, in blades divided in at least an inboard module and an outboard module, for the inboard module; said adaptive zone is located at the side corresponding to the root of the blade. Hereby it is achieved a manufacturing method of wind turbine blades of variable length where said variable length is concentrated in the root zone where there are small variations in the blade geometry.

In embodiments of the invention for blades divided in an inboard module and an outboard module, said enlarged manufacturing moulds are provided and used for the inboard module and/or the outboard module; said adaptive(s) zone(s) is/are located at the side in contact with the other module. Hereby there are achieved manufacturing methods of wind turbine blades of variable length where said variable length is concentrated on the distal end of the inboard module and/or on the frontal end of the outboard module where an increase of the length may have a significant effect in the AEP.

In embodiments of the invention for blades divided in an inboard module, an outboard module and an intermediate module between them, said enlarged manufacturing moulds are provided and used for the intermediate module; said adaptive(s) zone(s) is/are located at any side in contact with the inboard or outboard modules or at both sides. Hereby there are achieved manufacturing methods of wind turbine blades of variable length where said variable length is concentrated on an intermediate module.

In embodiments of the invention, each adaptive zone in a central section of the blade is configured with the same transversal section than the contiguous transversal section of the common zone in all its length. Hereby it is achieved a manufacturing method of wind turbine blades of variable length that allows an adaptation of the length of the blade to the features of its foreseen site at a low cost.

In embodiments of the invention, each adaptive zone in a central section of the blade is configured with a variable transversal section corresponding to a blade optimal shape in said adaptive zone (using for example flexible moulds). Hereby it is achieved a manufacturing method of wind turbine blades of variable length that allows an full adaptation of the length of the blade to the features of its foreseen site for optimizing the AEP.

In embodiments of the invention the length of each adaptive zone in each of said enlarged manufacturing moulds is comprised between the 1%-15% of the length of the common zone. On the other hand the length of the intermediate module is comprised between the 10%-30% of the length of the blade. Theses proportion avoid eventual detrimental effects due to the use of the above-mentioned enlarged manufacturing moulds.

Other features and advantages of the present invention will be understood from the following detailed description in relation with the enclosed drawings.

DETAILED DESCRIPTION OF PREFERRED EMBODIMENTS

This invention refers to wind turbine blades adaptable in length comprising wind turbine blades manufactured as single parts and to wind turbine blades manufactured by modules, particularly an inboard module and an outboard module. To solve the transportation problems posed particularly by lengthy blades, the division of the blade in two or more longitudinal sections provided with joining means is a well-known solution in the art.

Figure 1A:
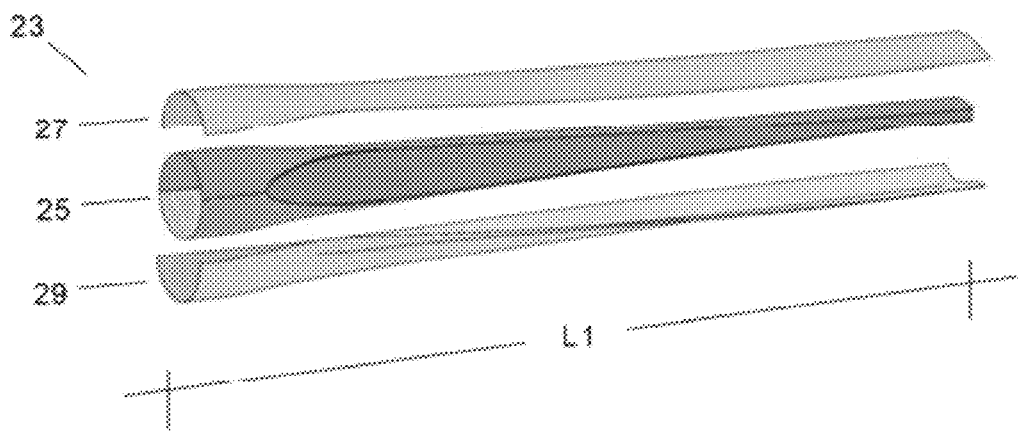
FIG. 1a shows in schematic perspective views the main components of the inboard module of a wind turbine blade.
Figure 1B:
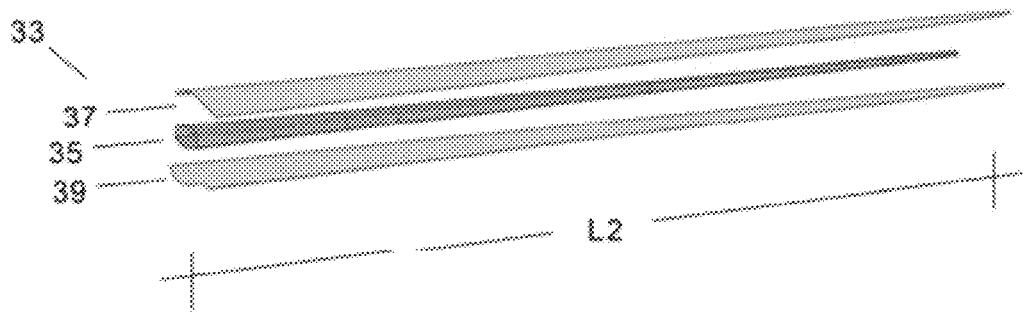
FIG. 1b shows in schematic perspective views the main components of the outboard module of a wind turbine blade.

As illustrated in FIGS. 1a and 1b the inboard module 23 of a blade of a length L1 is formed by an spar 25 (that may be divided in several panels) and upper and lower shells 27, 29, and the outboard module 33 of a blade of a length L2 is formed by an spar 35 and upper and lower shells 37, 39. Many other configurations of the blade are possible.

In any case all the basic components of said inboard and outboard modules 23, 33 are manufactured using suitable manufacturing moulds (preferable female moulds) for each single component of the module having, respectively, the same length as the length L1 or L2 of the corresponding module. Then all the components are bonded. During the manufacturing procedure the inboard and outboard modules are provided with joining means between them and with the rotor hub such as those disclosed for example in WO 2005/100781, WO 2006/103307, WO 2007/051879 in the name of the applicant.

Figure 2:
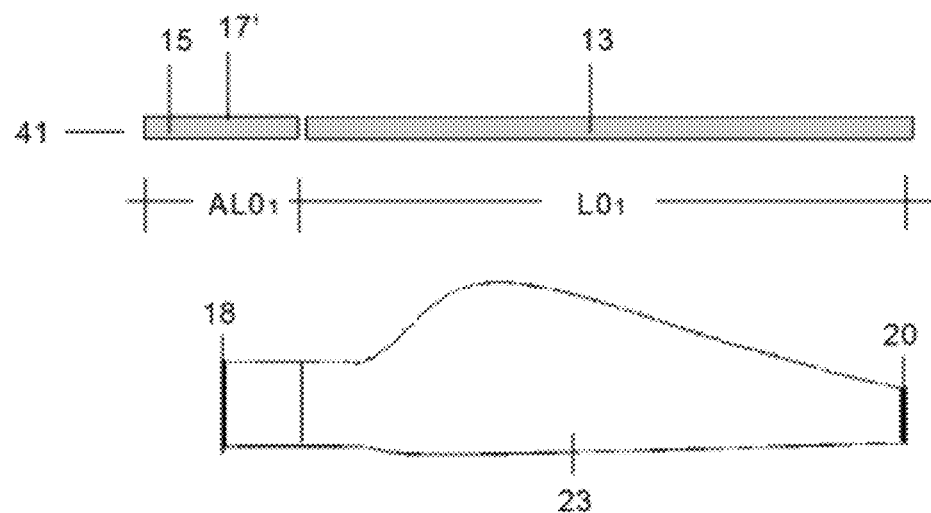
FIG. 2 shows schematically the enlarged manufacturing moulds with an adaptive zone in the root that are used for manufacturing an inboard module with a variable length according to the present invention and FIG. 3 shows schematically the enlarged manufacturing moulds of this zone.

In a first embodiment, the manufacturing method according to the present invention for manufacturing an inboard module 23 of a length L1 (or a whole blade manufactured as a single part), with joining means 18, 20 with, respectively, the rotor hub and the outboard module 33, is done, as illustrated in FIG. 2, using enlarged manufacturing moulds 41 (comprising all the moulds needed for manufacturing all its components) having a common zone 13 of a length $L0_1$ and an adaptive zone 15 in the root of a length $AL0_1$ comprised preferably between the 1-15% of $L0_1$.

If the inboard module 23 (or the whole blade) to be manufactured shall have for example a length of $L1=L0_1+0.05*L0_1$, the enlarged moulds 41 shall be arranged for said length during the manufacturing process placing in the position 17' determined by said length $L0+0.05*L0_1$ the template of the joining means 18 (preferably metallic inserts) with the rotor hub.

Figure 3:
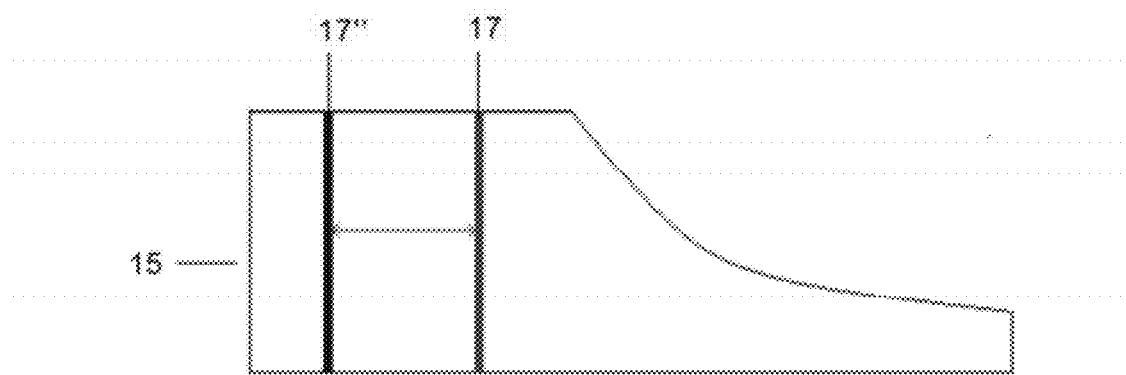

As illustrated in FIG. 3, said adaptive zone 15 is a zone without significant variations in its transversal section between the extreme positions 17, 17" of said joining means 18.

Figure 4:
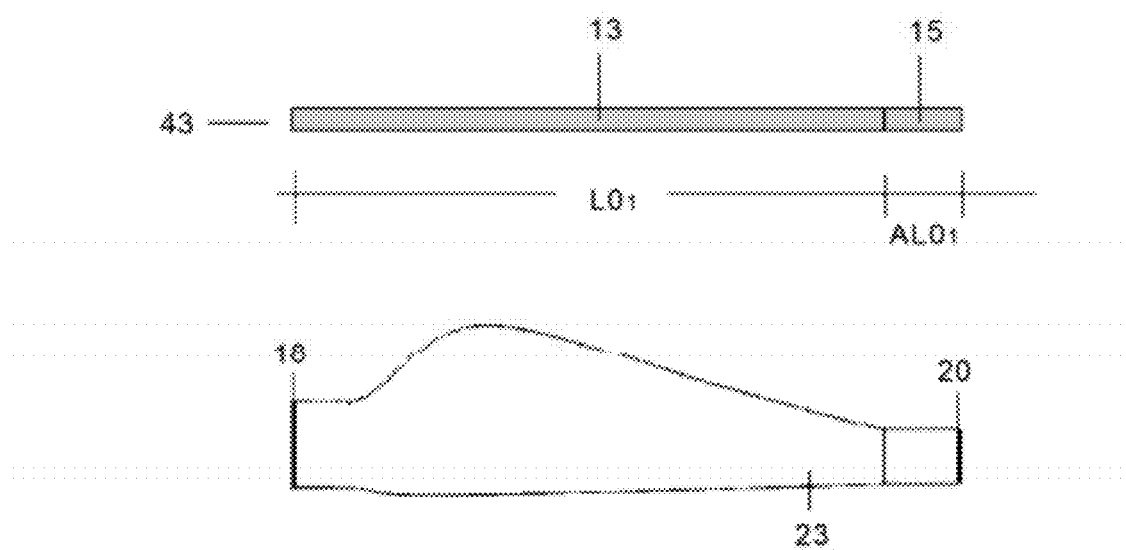
FIG. 4 shows schematically the enlarged manufacturing moulds with an adaptive zone at the end that are used for manufacturing an inboard module with a variable length according to the present invention.

In a second embodiment, the manufacturing method according to the present invention for manufacturing an inboard module 23 of a length L1, with joining means 18, 20 with, respectively, the rotor hub and the outboard module 33, is done, as illustrated in FIG. 4, using enlarged manufacturing moulds 43 having a common zone 13 of a length $L0_1$ and an adaptive zone 15 at the end of a length $AL0_1$ comprised preferably between the 1-15% of $L0_1$.

If the inboard module 23 to be manufactured shall have for example a length $L1=L0_1+0.10*L0_1$ the enlarged manufacturing moulds 43 shall be arranged with said length during its manufacturing. Therefore suitable configured additional manufacturing moulds for said adaptive zone 15 shall be provided whether with the same transversal section than the final transversal section of the common zone 13 or with a transversal section of variable shape.

Figure 5:
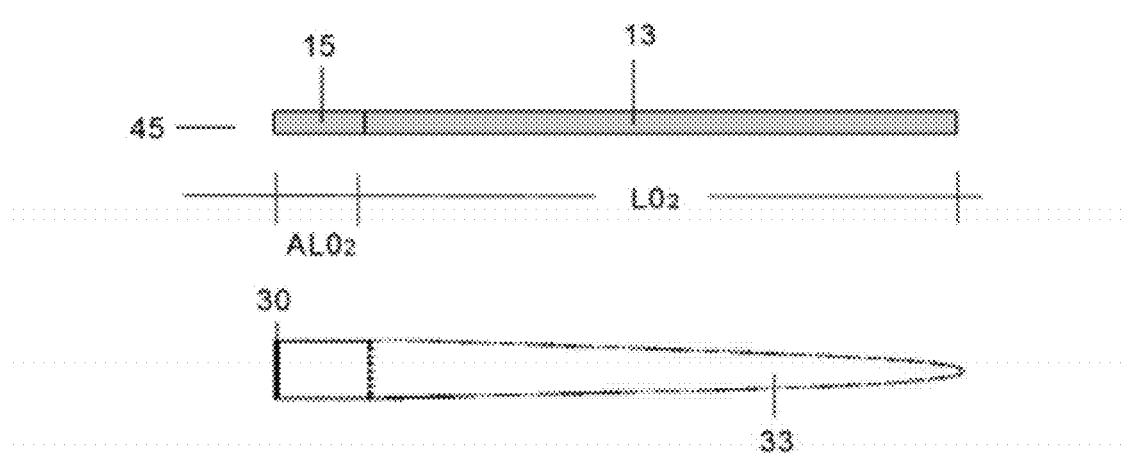
FIG. 5 shows schematically the enlarged manufacturing moulds with an adaptive zone at the beginning that are used for manufacturing an outboard module with a variable length according to the present invention.

In a third embodiment, the manufacturing process according to the present invention for manufacturing an outboard module 33 of a length L2 with joining means 30 with the inboard module 23, is done, as illustrated in FIG. 5, using enlarged manufacturing moulds 45 having a common zone 13 of a length $L0_2$ and an adaptive zone 15 at the beginning of a length $AL0_2$ comprised preferably between the 1-15% of $L0_2$.

If the outboard module 33 to be manufactured shall have for example a length $L2=L0_2+0.07*L0_2$ the enlarged manufacturing moulds 45 shall be arranged with said length during its manufacturing. Therefore suitable configured additional manufacturing moulds for said adaptive zone 15 shall be provided whether with the same transversal section than the initial transversal section of the common zone 13 or with a transversal section of variable shape.

Figure 6:
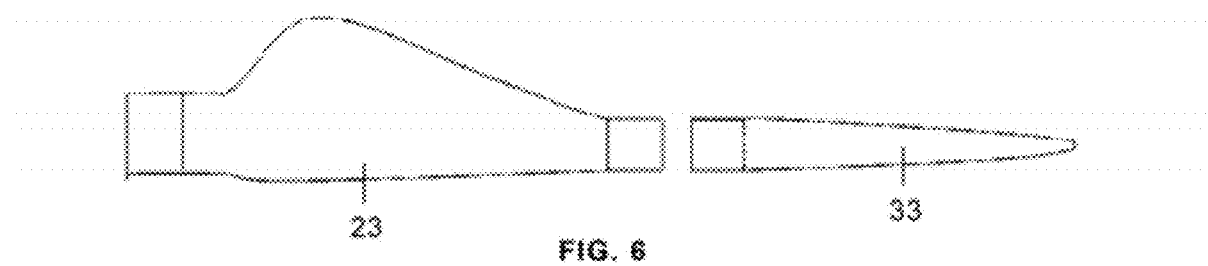
FIG. 6 shows a wind turbine blade divided in an inboard module and an outboard module with an optimum length for a given site manufactured using enlarged manufacturing moulds with three adaptive zones.

The above mentioned embodiments can be combined, so that the length of the adaptive zones 15 can reach a length, as illustrated in FIG. 6, comprised between the 1-30% of $L0_1$ in the inboard module 23 plus a length comprised between the 1-15% of $L0_2$ in the outboard module 33.

Figure 7:
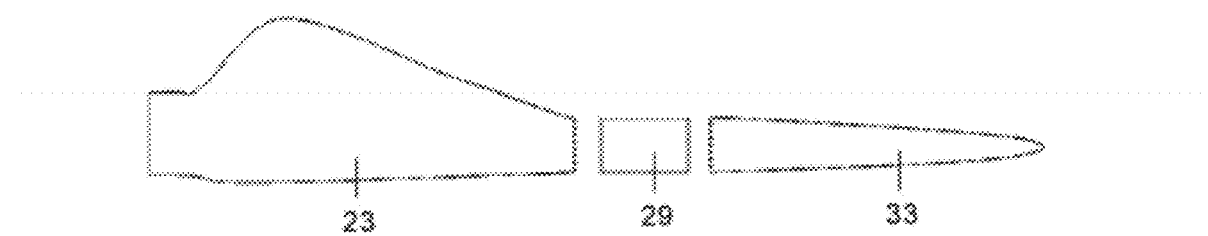
FIG. 7 shows a wind turbine blade divided in an inboard module, an intermediate module and an outboard module.
Figure 8:
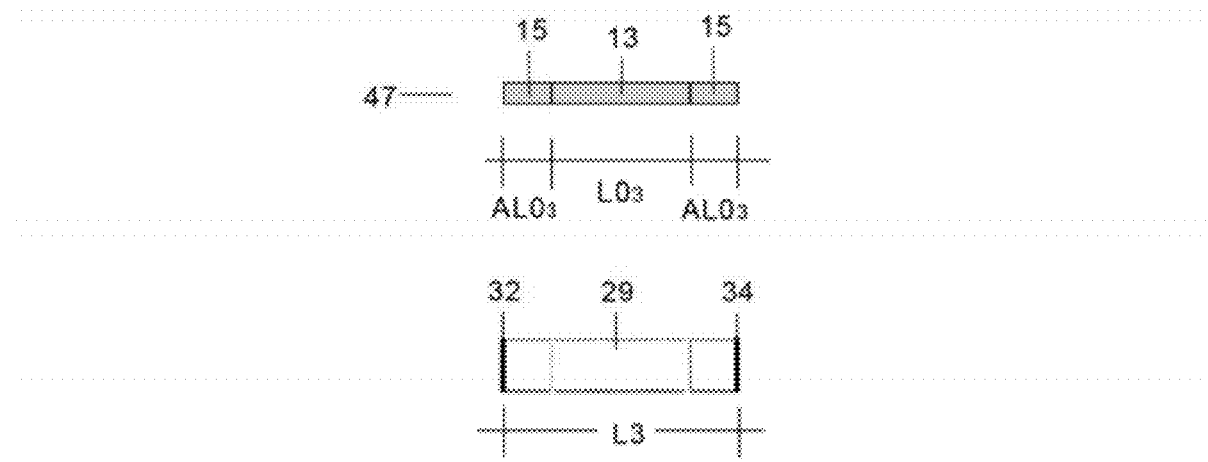
FIG. 8 shows schematically enlarged manufacturing moulds with two adaptive zones that are used for manufacturing an intermediate module with a variable length according to the present invention.

In a fourth embodiment, the manufacturing process according to the present invention is arranged, as illustrated in FIGS. 7 and 8, for manufacturing an extra intermediate module 29, with joining means 32, 34 with, respectively, the inboard module 23 and the outboard module 33, using enlarged manufacturing moulds 47 having a common zone 13 of a length $L0_3$ and an adaptive zone 15 at the beginning and/or at the end of a length $AL0_3$ comprised preferably between the 1-15% of $L0_3$, the maximum length of the intermediate module 29 being comprised between the 10-30% of the total length of the blade.

If the intermediate module 29 to be manufactured shall have for example a length L3 the enlarged moulds 47 shall be arranged with said length during its manufacturing. Therefore suitable configured additional manufacturing moulds for said adaptive zones 15 shall be provided whether with the same transversal section than the initial transversal section of the common zone 13 or with a transversal section of variable shape.

Figure 9:
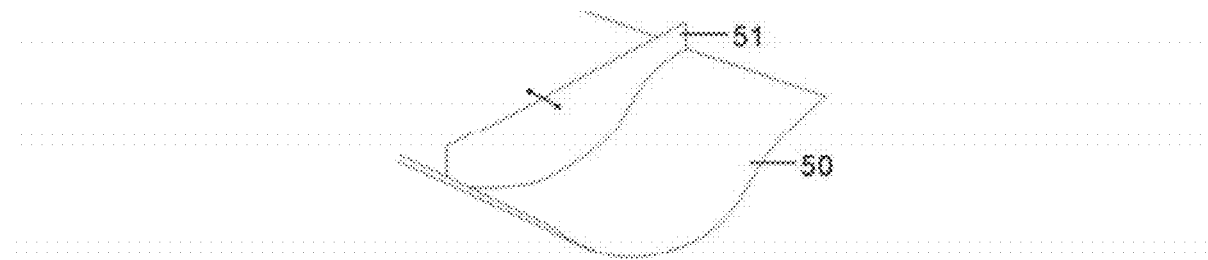
FIG. 9 shows schematically an example of an enlarged manufacturing mould that can be used in the manufacturing methods illustrated in FIGS. 4, 5 and 8.

The configuration of the transversal section of said adaptive zones 15 at the end of the inboard module 23, at the beginning of the outboard module 33 or at the beginning or end of the intermediate module 29 with a constant shape facilitates the manufacturing of blades of variable length but the final shape of the blade is not an aerodynamic optimal shape. FIG. 9 shows schematically an example of a mould 50 for a shell in said adaptive zones 15 with a movable template 51.

The configuration of the transversal section of said adaptive zones 15 at the end of the inboard module 23 or at the beginning of the outboard module 13 or at the beginning or end of the intermediate module 29 with a variable shape so that the final shape of the blade is as close as possible to an aerodynamic optimal shape requires suitable moulds that can be provided as ad-hoc rigid moulds or as adapted flexible moulds.

The installation of blades of different length in a same type of wind turbine in sites of different characteristics for optimizing the AEP may produce effects in several wind turbine features such as the blade tip noise, the deflection of the blade and the eigenfrequencies of the blade that shall be taken into account during the tuning of the wind turbine control system.

In any case, the above-mentioned defined margins for the adaptive zones 15 have been set up for minimizing any detrimental effect.

Although the present invention has been fully described in connection with preferred embodiments, it is evident that modifications may be introduced within the scope thereof, not considering this as limited by these embodiments, but by the contents of the following claims.

The invention claimed is:

1. A method for manufacturing a wind turbine blade of an optimal length comprising steps of:
   producing an inboard module from a first enlarged manufacturing mould, wherein the inboard module is a component of the blade extending from a boundary where the blade is connected to a rotor hub of a wind turbine to a boundary in a center portion of the blade,
   producing an outboard module from a second enlarged manufacturing mould, wherein the outboard module is a component of the blade extending from a boundary in the center portion of the blade to a tip of the blade,
   wherein the first and second enlarged manufacturing moulds comprise a common zone of a predetermined length and an adaptive zone arranged with a length needed for manufacturing the blade with an optimal overall length,
   wherein the optimal overall length is a length needed for optimizing the annual energy production of a predetermined wind turbine model in a predetermined site.

2. The method according to claim 1, wherein the optimal overall length minimizes detrimental effects including blade tip noise, deflection of the blade, and Eigen frequencies of the blade.

3. The method according to claim 1, wherein the adaptive zone and the common zone are configured with a same transversal section.

4. The method according to claim 1, wherein the adaptive zone is configured with a variable transversal section corresponding to a blade optimal shape in said adaptive zone.

5. The method according to claim 1, wherein said adaptive zone is configured with a variable transversal section corresponding to a blade optimal shape and in said adaptive zone the first and second enlarged manufacturing moulds are flexible moulds.

6. The method according to claim 1, wherein the length of the adaptive zone is between 1%-15% of the length of the common zone.

7. A wind turbine blade manufactured by the method according to claim 1.

8. A method for manufacturing a wind turbine blade of an optimal length comprising steps of:
   producing an inboard module from a first enlarged manufacturing mold,
   producing an outboard module from a second enlarged manufacturing mold,
   wherein the second enlarged manufacturing mold comprises a common zone of a predetermined length and an adaptive zone arranged with an adaptable length,
   wherein the second enlarged manufacturing mold comprises a moveable template for adjusting the length of the adaptive zone.

9. A method for manufacturing a wind turbine blade of an optimal length comprising steps of:
   producing an inboard module from a first enlarged manufacturing mold,
   producing an outboard module from a second enlarged manufacturing mold,
   wherein the first enlarged manufacturing mold comprises a common zone of a predetermined length and an adaptive zone arranged with an adaptable length,
   wherein the first enlarged manufacturing mold comprises a moveable template for adjusting the length of the adaptive zone.

* * * * *